April 12, 1966 F. A. PIZZARELLO 3,245,847
METHOD OF PRODUCING STABLE GALLIUM ARSENIDE
AND SEMICONDUCTOR DIODES MADE THEREFROM
Filed Nov. 19, 1962 8 Sheets-Sheet 1

INVENTOR.
FRANK A. PIZZARELLO,
BY
Charles P. Haughey
ATTORNEY.

April 12, 1966 F. A. PIZZARELLO 3,245,847
METHOD OF PRODUCING STABLE GALLIUM ARSENIDE
AND SEMICONDUCTOR DIODES MADE THEREFROM
Filed Nov. 19, 1962 8 Sheets-Sheet 2

April 12, 1966 F. A. PIZZARELLO 3,245,847

METHOD OF PRODUCING STABLE GALLIUM ARSENIDE AND SEMICONDUCTOR DIODES MADE THEREFROM

Filed Nov. 19, 1962

8 Sheets-Sheet 3

April 12, 1966 F. A. PIZZARELLO 3,245,847

METHOD OF PRODUCING STABLE GALLIUM ARSENIDE AND SEMICONDUCTOR DIODES MADE THEREFROM

Filed Nov. 19, 1962 8 Sheets-Sheet 4

April 12, 1966 F. A. PIZZARELLO 3,245,847

METHOD OF PRODUCING STABLE GALLIUM ARSENIDE AND SEMICONDUCTOR DIODES MADE THEREFROM

Filed Nov. 19, 1962 8 Sheets-Sheet 8

3,245,847

METHOD OF PRODUCING STABLE GALLIUM ARSENIDE AND SEMICONDUCTOR DIODES MADE THEREFROM

Frank A. Pizzarello, Santa Ana, Calif., assignor to Hughes Aircraft Company, Culver City, Calif., a corporation of Delaware Filed Nov. 19, 1962, Ser. No. 238,565
11 Claims. (Cl. 148—177)

This invention relates to the production of gallium arsenide semiconductor material, and particularly to the production of stable tunnel diodes or material from which stable devices may be produced.

Gallium arsenide is an advantageous material for production of tunnel diodes. It has a relatively high band gap, which results in a high voltage swing and, therefore, a high power semiconductor device, but in the present state of the art gallium arsenide (GaAs) tunnel diodes are subject to degradation in two important ways. First, the peak current will drop during operation, and second, the valley current will rise under high temperature (170° C.) storage. These two forms of degradation of properties appear to be alternative, but in each case the peak to valley current ratio of the tunnel diode device is seriously reduced, and the voltage swing is reduced.

The problems of degradation of gallium arsenide material, or tunnel diode, properties have been largely reduced, or solved, and highly stable devices produced in highly zinc doped gallium arsenide material prepared under conditions of excess arsenic, or arsenic rich compounds, by a mechanism which is not yet wholly understood, but which is believed to markedly reduce arsenic vacancies in the gallium arsenide crystal lattice and control the concentration of zinc distributed between lattice sites and interstitial positions.

For further consideration of what is believed to be novel and inventive, attention is directed to the following portions of the specification, the appended claims and the drawing in which:

Figure 1:
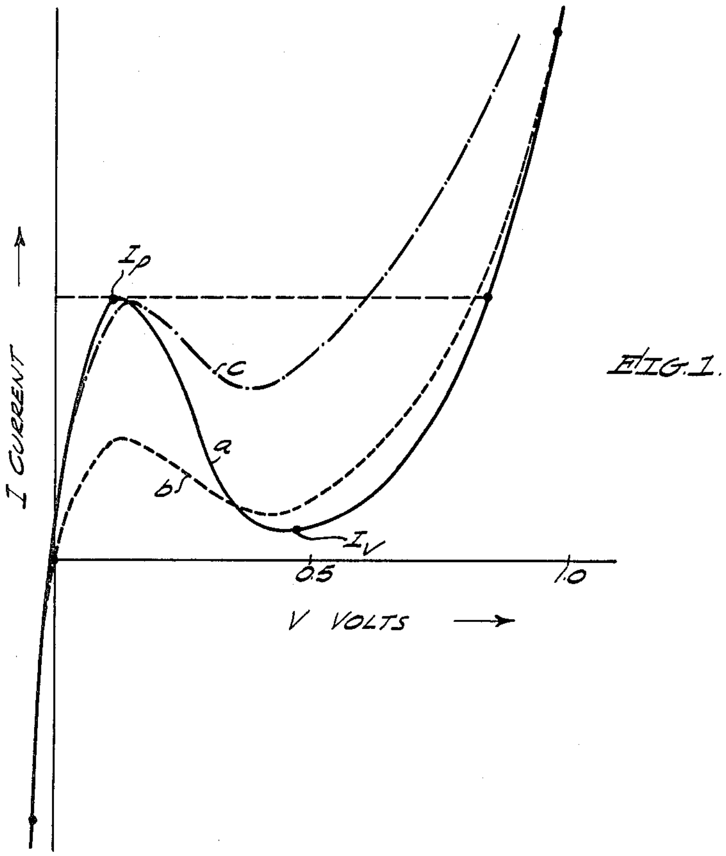
FIG. 1 illustrates the degradation problem solved by applicant.

As shown in FIG. 1, a typical current-voltage (I-V) curve for tunnel diodes is illustrated by curve *a* wherein a peak forward current $I_p$ and a valley current $I_v$ are shown. When a gallium arsenide tunnel diode made by techniques presently current in the art is operated for a substantial period of time under forward bias greater than the valley voltage, but without significant heating of the diode, the I-V curve degrades to that shown by curve *b* of FIG. 1 wherein the peak current is markedly reduced, and the valley current is substantially unchanged. The peak to valley ratio, or the ratio of the peak current to the valley current, is seriously reduced. This has been called "forward injection failure." It has been found that this forward injection degradation consists primarily of a decrease in tunneling current, and is generally accompanied by a widening of the depletion layer and a decrease in junction capacitance. There is often a slight increase in the valley current. This forward injection failure type of degradation is not believed due to heating because diodes biased at the peak current or at a reverse current of equal magnitude do not so degrade, while diodes biased to a sufficient forward voltage to produce forward injection current exceeding the peak current do in time degrade in the manner shown. Also, thermal failure shows a different mode of degradation. It is believed that a transport phenomenon may be responsible for this forward injection failure type degradation.

Curve *c* in FIG. 1, illustrates degradation of devices after life testing (or storage) at elevated temperature of around 170° C., measurements being made at room temperature. As illustrated, the peak current remains substantially constant while the valley current markedly increases, greatly reducing the peak to valley current ratio, and in some cases eliminating the negative resistance portions of the I-V curve, as shown in FIG. 2.

Figure 2:
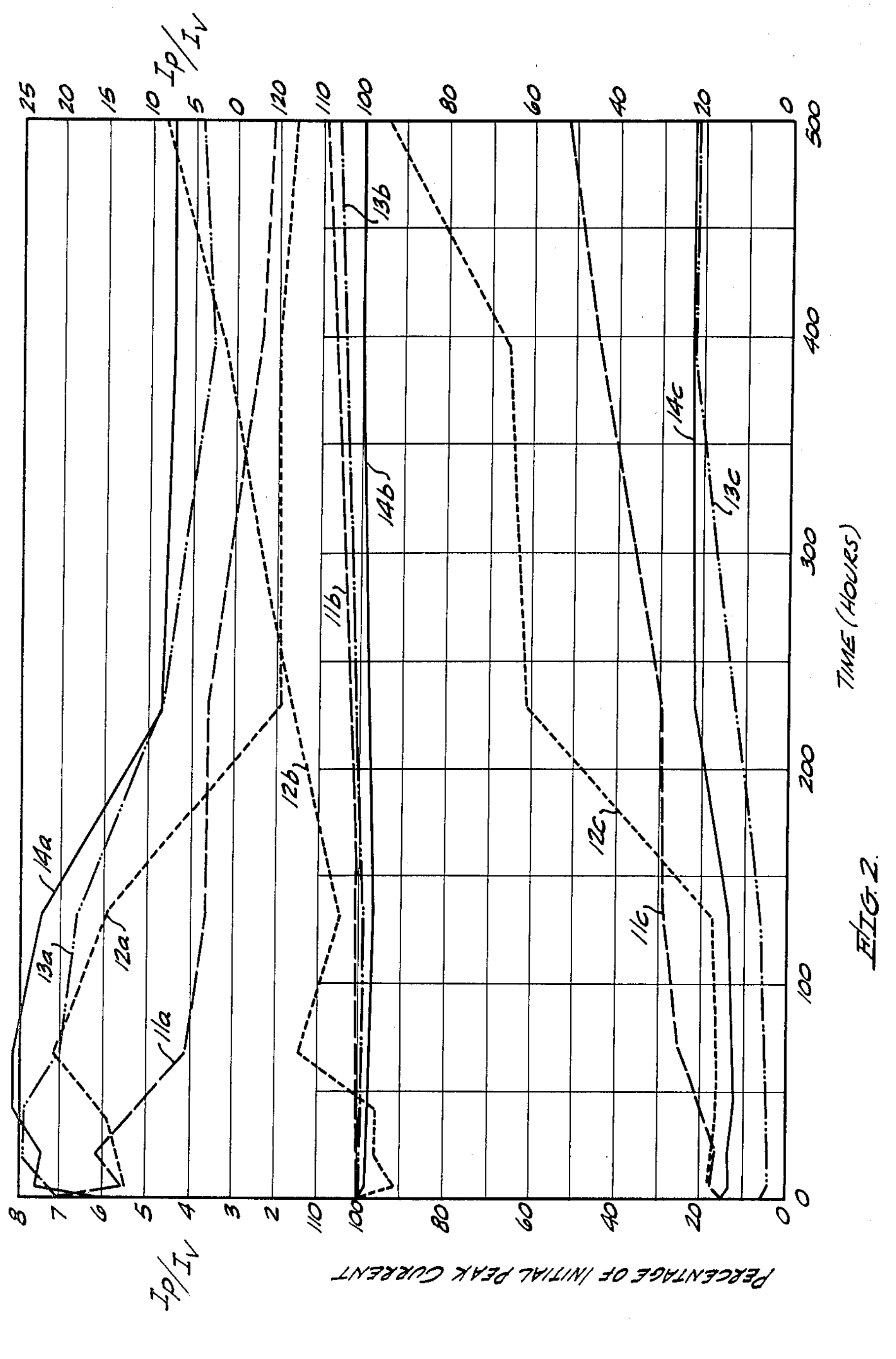
FIG. 2 illustrates thermal failure of gallium arsenide tunnel diodes.

Thermal failure of conventional gallium arsenide tunnel diodes, as illustrated in FIG. 1, curve *c* is further illustrated by data represented, for storage at 175° C. of four diodes 11, 12, 13 and 14, in FIG. 2 in curves plotted against time in hours for: peak-to-valley current ratios (curves 11*a*, 12*a*, 13*a* and 14*a*); peak currents ($I_p$) as a percentage of original peak current (curves 11*b*, 12*b*, 13*b* and 14*b*); and valley current as a percentage of original peak current (curves 11*c*, 12*c*, 13*c* and 14*c*). These curves are characterized primarily by a permanent increase in valley current ($I_v$) which results in decreased peak-to-valley current ratios ($I_p/I_v$). An increase of peak current is also shown for diode 12, but an even greater increase of valley current, curve 12*c*, resulted in an over-all decrease of peak-to-valley current ratio as shown by curve 12*a*.

Figure 3:
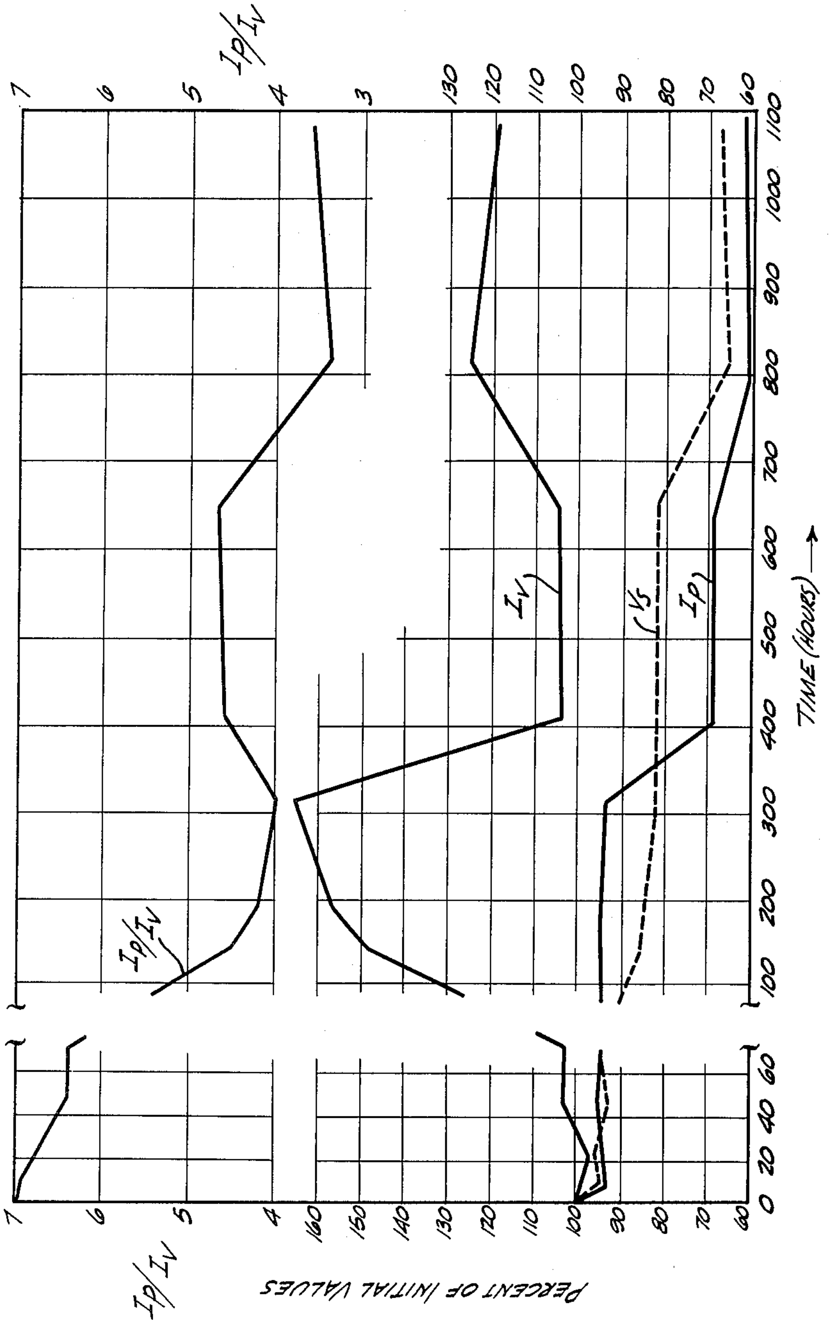
FIG. 3 illustrates forward injection failure in gallium arsenide tunnel diodes.

In FIG. 3 forward injection failure is illustrated for a particular gallium arsenide diode 16 by the curve representing $I_p/I_v$ peak to valley ratio, $I_v$ the valley current, $V_s$ the voltage swing, and $I_p$ the peak current, all plotted against time in hours. The rapid property changes at around 100 hours, 350 hours, and 700 hours indicate a stepwise degradation of $I_p$, the mechanisms of which are as yet subject to considerable speculation.

The above illustrated unstable gallium arsenide tunnel diodes have been produced under conditions of effective arsenic pressure of less than about one atmosphere by regrowing zinc dopant into gallium arsenide, or diffusing zinc into gallium arsenide, to produce P-type electrical conductivity material by the use of molten gallium zinc material. Zinc is a preferred dopant material for gallium arsenide because of its high solid solubility in gallium arsenide. Cadmium has a less high solid solubility in gallium arsenide, and may also be used as a dopant material to produce tunnel diodes. Since tunnel diodes require degenerate doping on each side of the junction, the junction ordinarily being up to about 50 angstroms thick, high solid solubility of the dopant material is required.

Figure 4:
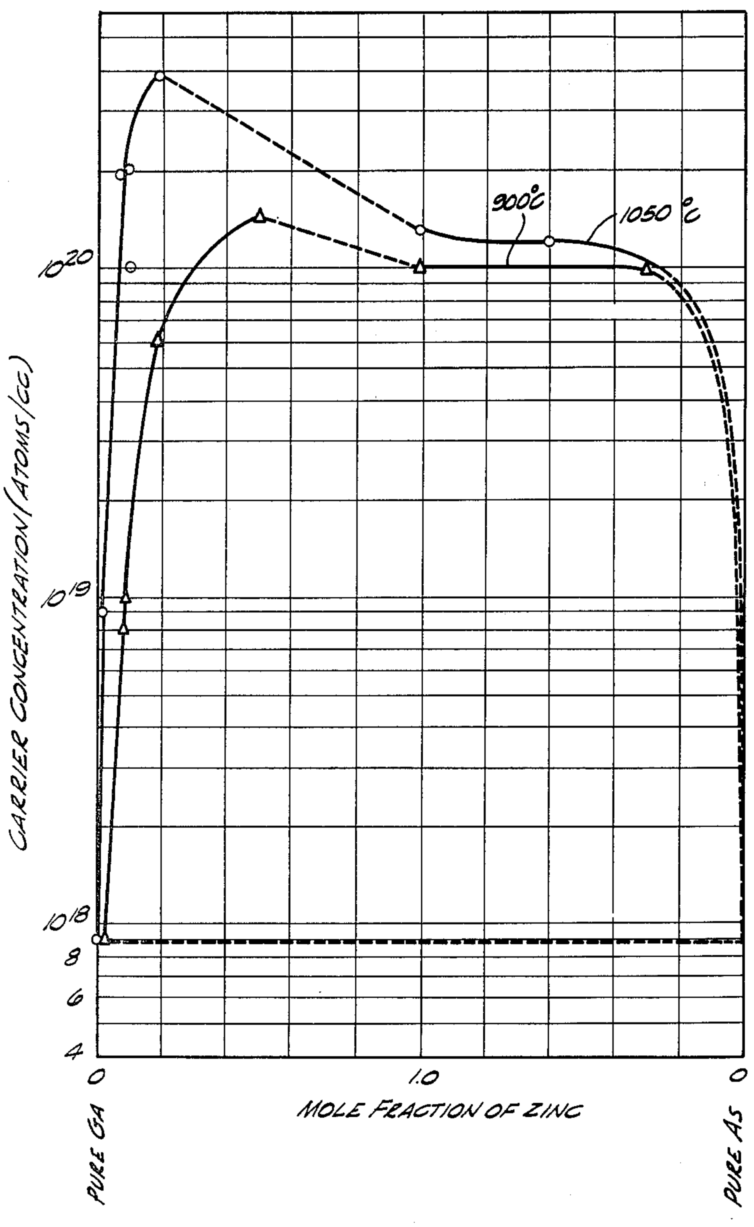
FIG. 4 shows doping effectiveness of Zn-Ga Zn-As solvents.

FIG. 4 illustrates the solubility of zinc into gallium arsenide from zinc gallium and zinc arsenic solvents at temperatures at 900° C. and 1,050° C. Carrier concentrations in excess of $10^{20}$ atoms per cc. may be produced from zinc gallium solvents containing in excess of about .3 mole fraction of zinc, or from zinc arsenic solvents containing in excess of about .3 mole fraction of zinc. In view of the facts illustrated by FIG. 4, it is believed that by variation of the concentrations of material in the solvents used for zinc doping of gallium arsenide, the distribution of lattice vacancies between the gallium and the arsenic sublattices may be markedly affected. By utilizing a zinc arsenic solvent material of relatively high arsenic concentration, or by doping gallium arsenide with zinc in the presence of very high arsenic partial pressures of the order of 5 to 10 atmospheres, the distribution of zinc into lattice vacancies may be influenced; the number of arsenic lattice vacancies may be reduced; and the properties of the gallium arsenide semiconductor material produced may be so affected as to be less susceptible to degradation of the thermal and forward injection types previously discussed. Also, GaAs equilibrated in gallium-rich solution show a greater degree of retrograde solubility than GaAs equilibrated in arsenic-rich solution, thus avoiding any degradation caused by the precipitation of zinc as a second phase in the depletion region. A precipitation of this kind can also explain the peak current drop, because a reduction of current carriers will occur.

Figure 5:
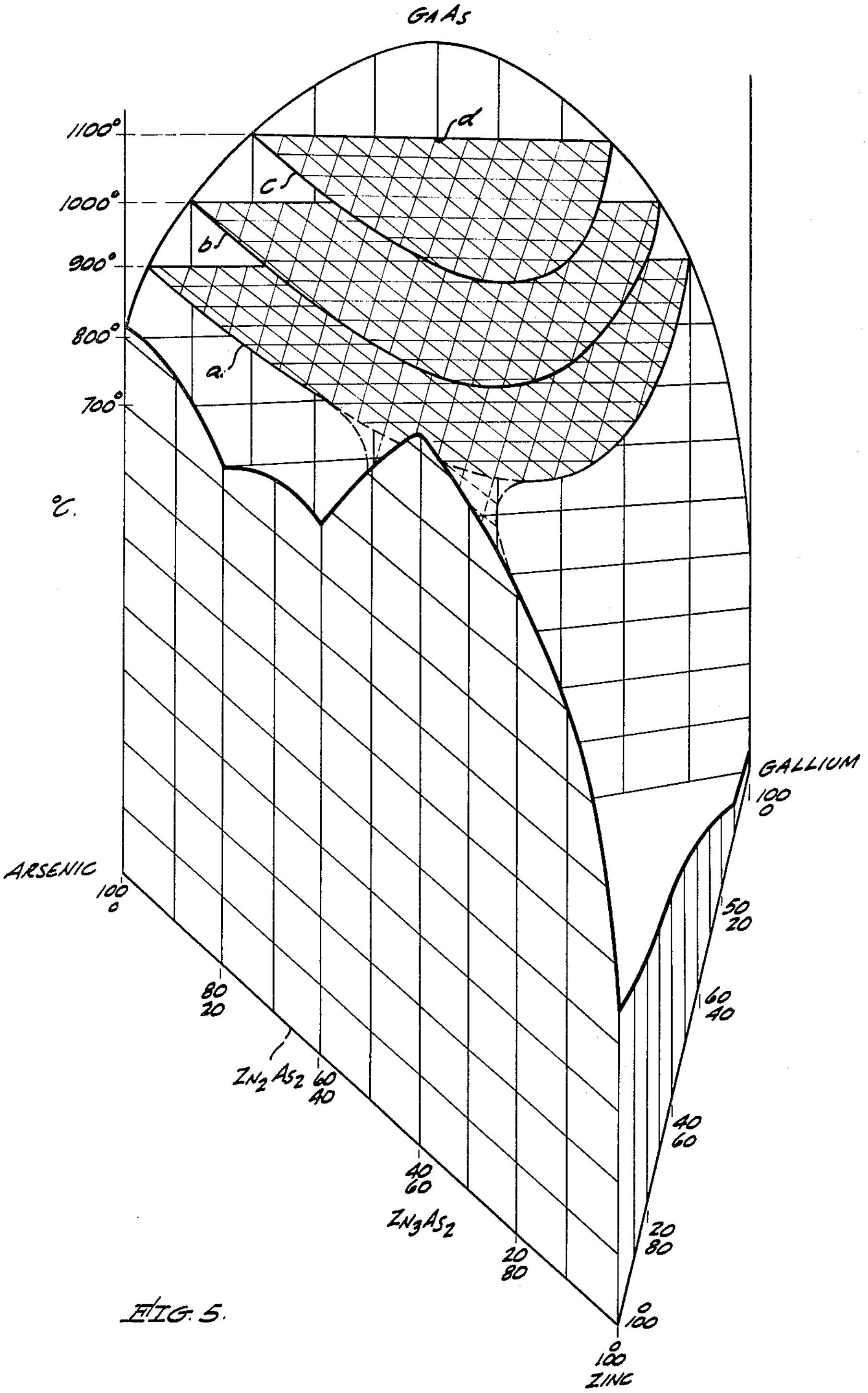
FIG. 5 shows a three phase gallium-arsenic-zinc equilibrium diagram.

FIG. 5 shows a three phase gallium-arsenide-zinc equilibrium diagram with the melting point isotherm curves *a*, *b*, *c* shown for 900° C., 1,000° C., and 1,100° C. By reference to FIG. 5 it is observed that, for example, at 1,000° C. molten material of any composition on curve *b* shown is in equilibrium with substantially 50 atomic percent gallium 50 atomic percent arsenic material on curve *d*. In other words, single crystal gallium arsenide may be produced from substantially any zinc-gallium-arsenic ternary liquid at 1,000° C. Although gallium arsenide is generally considered to be a compound of fixed composition, it is believed to be variable within very small limits due to the presence of varying amounts of "impurities" or doping materials which generally occupy lattice positions in the crystal. Whether such dopant materials, such as zinc, occupy gallium or arsenic positions will affect the actual relative percentage of gallium and arsenic present, and the variation in composition so obtained is represented in FIG. 5, in the 1,100° C. isothermal of curve *c* by a GaAs curve *d* whose size is greatly exaggerated. In practice, however, when gallium arsenide crystals are formed in the presence of excess of arsenic, the resulting crystal will be highly P-type, which appears to follow equilibrium rules in so far as the existence of curve *d* is concerned. By this method doping, either by regrowth or saturation diffusion, the concentration of zinc may be controlled within the ranges indicated in FIG. 4.

From the teaching of FIG. 4, the solvent material should contain up to about 45 to 55 mole percent arsenic in a Ga-As-Zn solution to produce the desired carrier concentration. In practice, for the regrowth method, the zinc arsenic compound ($ZnAs_2$) may be used with gallium arsenide material, and preferably in the presence of excess arsenic to insure the maintenance of sufficient arsenic in the melt. At high arsenic pressure exceeding .60 mole fraction a low doping concentration results which may be applicable for the fabrication of slow diodes and backward diodes. This is important from the device fabrication point of view.

By carrying out the regrowth, or diffusion doping, of gallium arsenide in a closed system with zinc arsenic gallium solvent in contact with the gallium arsenide material, with arsenic in the system to assist in maintenance of high arsenic vapor pressure, the conditions are established for the production of stable gallium arsenide p-type material.

To produce a stable p-type gallium arsenide material, and stable tunnel diodes therefrom according to the principles above discussed, crystalline gallium arsenide of either n or p-type is first subjected to zinc doping at doping temperature in the presence of high arsenic pressure to produce highly doped p-type material. Devices made from such material will be stable if the stability thereof is not lost in further processing by exposure to low arsenic, high temperature conditions.

Figure 7:
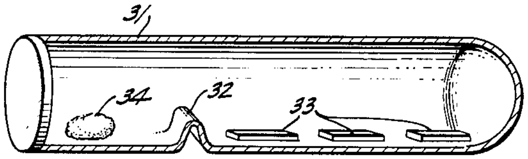
FIG. 7 illustrates an alternate technique for producing stable material according to this invention.
Figure 6:
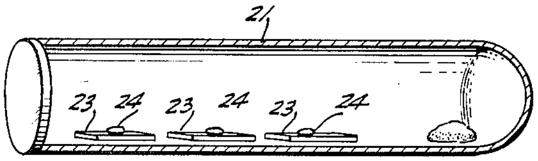
FIG. 6 illustrates one technique for producing stable material according to this invention.

FIGS. 6 and 7 illustrate equipment for producing stable gallium arsenide as described in Examples 1 and 2 below.

*Example 1*

N-type gallium arsenide having $10^{17}$ to $10^{15}$ carriers per cc. is to be stabilized. Although n-type material is more commonly available, starting material may alternatively be p-type material. As shown in FIG. 6, gallium arsenide dies 23, are placed into a quartz ampule 21, and an extra quantity of arsenic 22 is placed in the ampule out of direct contact with the dies. A small portion, or pellet 24 of zinc arsenide ($Zn_3As_2$) containing about 40 mole percent arsenic and the balance zinc and weighing about 20 to 40 milligrams is placed on the die. A small depression may be prepared on the die to receive the pellet 24 so that it will not roll off the die. The ampule 21 is sealed at a pressure of $10^{-5}$ mm. Hg, and is then subjected to a temperature of from 900° C. to 1,050° C. for about two minutes. The ample is then cooled at a rate of about 2.4° C. per hour for a total of 150° C. before quenching. A regrowth region of .010 inch to .018 inch is formed, and additional quantities of zinc diffuse through the die to change the diffused portion thereof to p-type material. Both the regrown region and the diffused region are degenerately doped p-type, and may be suitable for production of tunnel diode devices.

*Example 2*

An alternate method of preparing heavily zinc doped p-type gallium arsenide is illustrated in FIG. 7 wherein a quartz ampule 31 containing a bridge 32 therein is charged with gallium arsenide crystal material on one side of the bridge, such as dies 33, and a volume 34 of zinc diarsenide ($ZnAs_2$) together with sufficient excess arsenic to adjust the internal ampule pressure at maximum temperature to about 5 to 10 or more atmospheres of arsenic. The ampule is then sealed at a pressure of $10^{-5}$ mm. Hg, and subsequently is heated to a temperature of 1,050° C. and held for a period of about 7 days to allow diffusion to proceed to saturation. The resulting gallium arsenide dies 33 will be degenerately doped p-type by the diffusion mechanism.

Material prepared by either of the methods of Examples 1 and 2, is then mounted on based contacts by a gold bonding process, by conventional techniques. A p-n junction may next be formed by contacting an alloy of 1% tellurium, balance tin, on the end of a gold lead to a surface of the p-type degenerate arsenic material for a period of about two minutes at a temperature of about 500 to 600° C. Upon cooling, a regrown n-type region is formed which is about 50 angstroms thick. Excess thickness, greater than a minority carrier diffusion length, will prevent tunneling action. The device resulting may then be encapsulated, by a conventional technique, for subsequent use.

Figure 8:
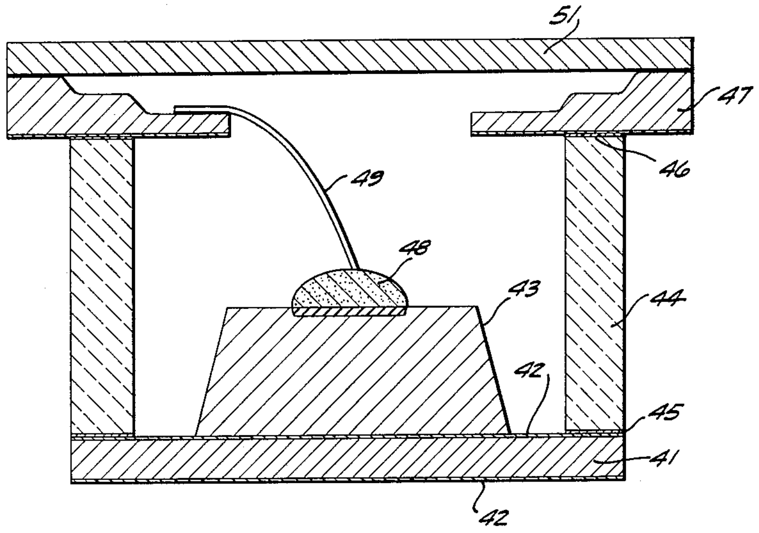
FIG. 8 is a sectional view of a diode according to this invention.

Gallium arsenide material of p-type, produced by one of the methods above described, may be fabricated into either point type or alloy type tunnel diodes. An alloy type diode, illustrated in FIG. 8, may be produced by assembling on a bottom tab 41, coated on both sides with gold-antimony alloy 42, a p-type gallium arsenide crystal die 43 in the center of the tab, a ceramic ring 44 having metallized ends 45, 46 around the crystal die, a tin bonding alloy on the top surface of the ring 44, and a shoulder ring 47 on the bonding alloy. The assembly is then bonded at about 600° C. in hydrogen atmosphere, after which a tin-tellurium pellet 48 is placed on the die 43 and a platinum wire 49 contacted to the pellet. The pellet is then melted, the wire moved into the melt, and the assembly cooled. The other end of the wire 49 is next welded to the shoulder ring 47, and the assembly etched in fresh 5% potassium hydroxide to clean the die, followed by suitable rinse and drying. A top tab 51 is next bonded to the shoulder ring 47, as by a gold antimony alloy, to complete the assembly.

Diodes produced by the methods above described were stored at about 175° C. and periodically tested.

Figure 9:
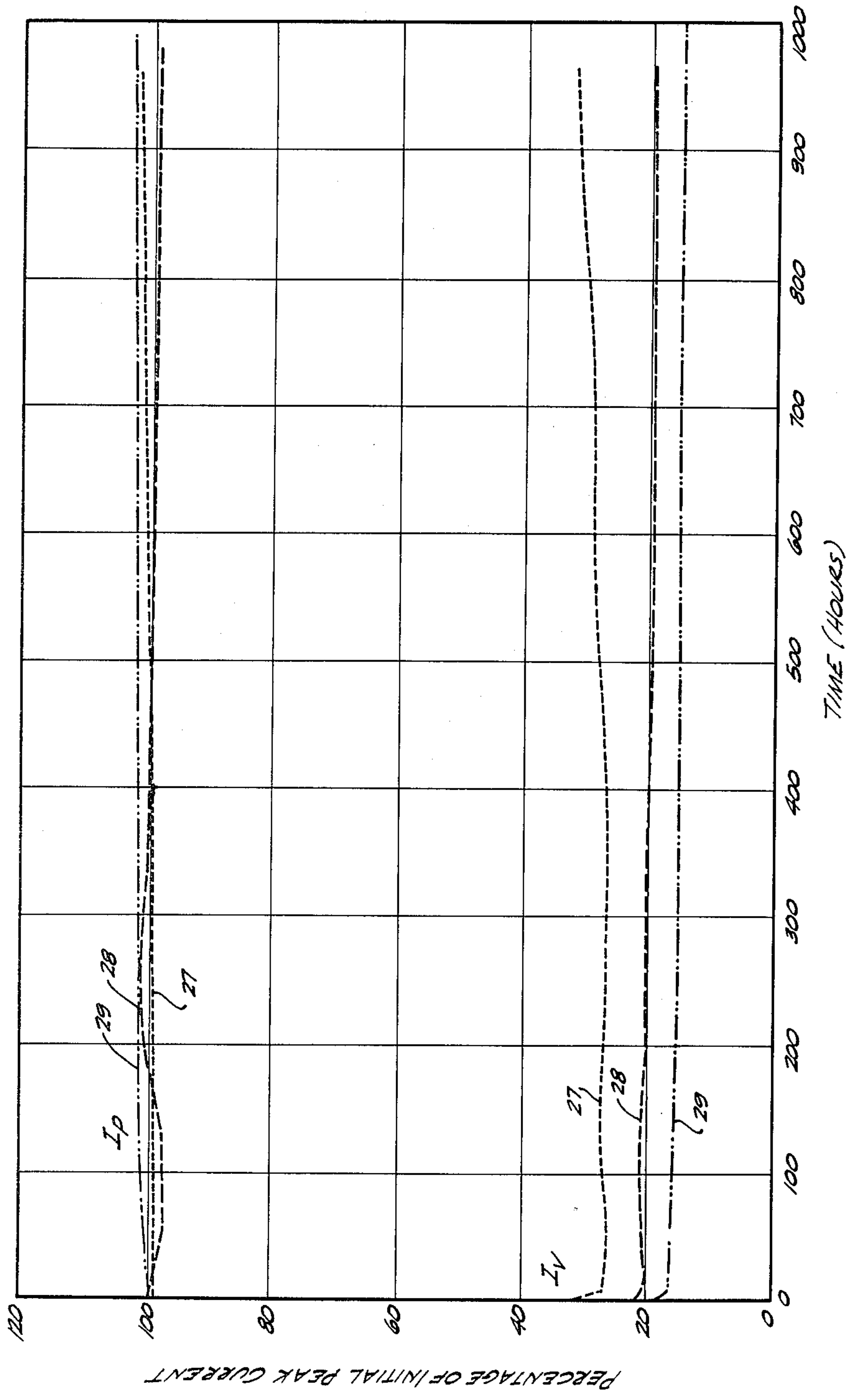
FIG. 9 shows the stability of peak current of devices produced according to this invention.
Figure 10:
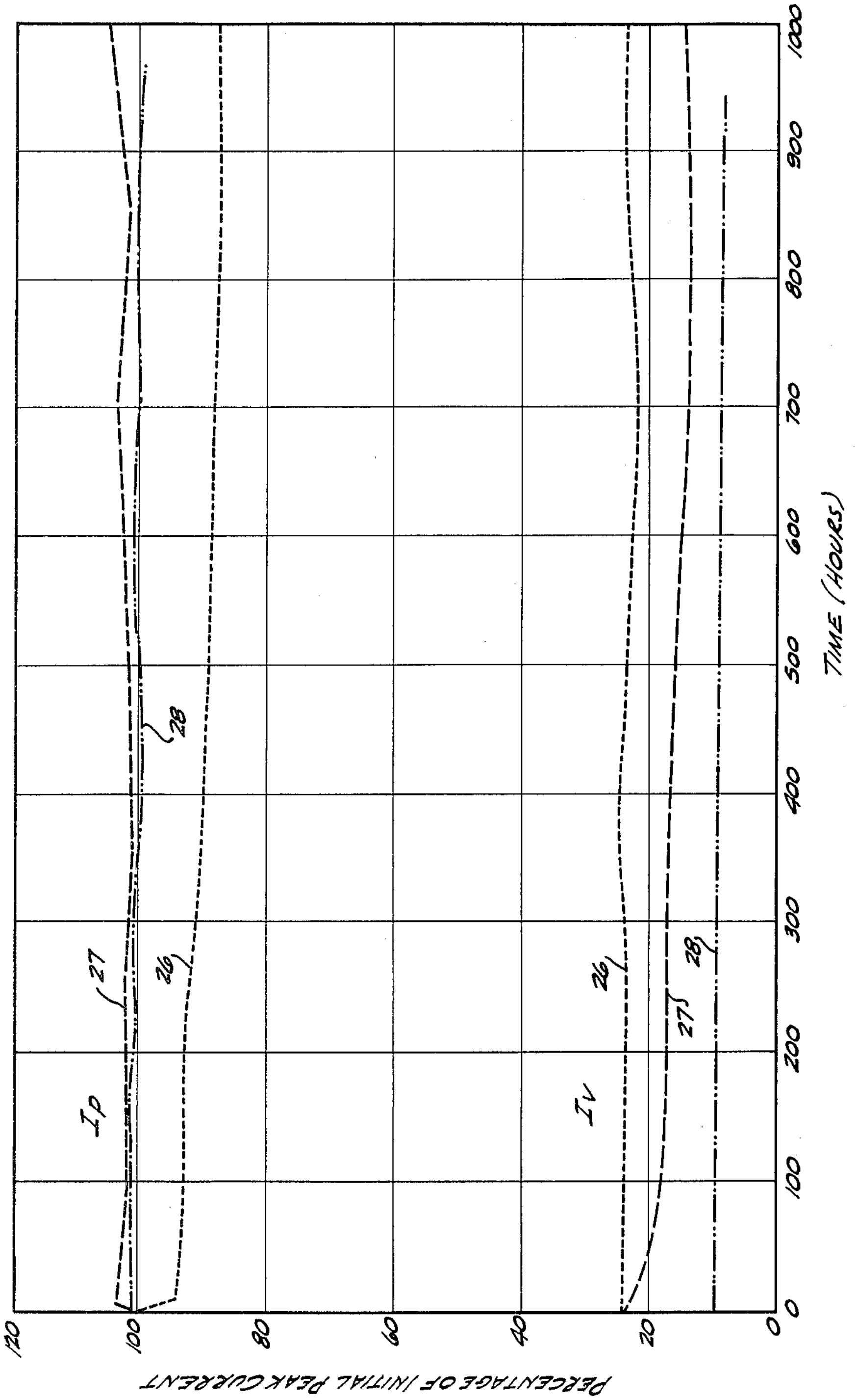
FIG. 10 shows the thermal stability of devices produced according to this invention.

FIG. 9 shows the percentage of initial peak current $I_p$ plotted against time for several diodes 27, 28 and 29 as being a substantially straight line. This is in contrast to the showing of thermal failure in FIG. 2. $I_v$ against time curves are also substantially straight lines. FIG. 10 shows the effect of testing for forward injection failure, and plots $I_p$ and $I_v$ for several diodes 26, 27 and 28. After small initial change in each case, these curves are substantially constant for the balance of 1,000 hours test period.

What is claimed is:

1. The method of degenerately doping crystalline gallium arsenide semiconductor material which comprises: subjecting such material to a zinc dopant at doping temperature in the presence of an excess of arsenic.

2. The method of degenerately doping crystalline gallium arsenide semiconductor material with a p-type dopant of the class consisting of zinc and cadmium which comprises:
exposing said material to the dopant at doping temperatures in the presence of excess arsenic.

3. The method according to claim 2 wherein the arsenic pressure is at least 5 atmospheres.

4. The method of producing degenerately doped P-type gallium arsenide semiconductor material which comprises:
subjecting the material in crystalline form to a molten phase consisting of gallium, zinc, and at least 30% arsenic.

5. The method according to claim 4 wherein an atmosphere in excess of 1 atmosphere pressure of arsenic is maintained over the molten alloy.

6. A method of producing gallium arsenide semiconductor material which comprises:
contacting crystalline gallium arsenide semiconductor material with a liquid ternary phase of zinc, gallium and at least 30% arsenic for a period sufficient to degenerately dope the semiconductor material with zinc; and
cooling the material.

7. The method according to claim 6 wherein the ternary liquid phase is at a temperature below 1237° C.

8. The method of producing a stable gallium arsenide semiconductor diodes which comprises:
degenerately doping crystalline gallium semiconductor material with a p-type dopant of the class consisting of zinc and cadmium in the presence of excess arsenic and in an atmosphere of at least one atmosphere pressure arsenic,
and subsequently alloy bonding an n-type dopant material to said semiconductor material to produce an n-type alloy regrown region in the material and form therewith a p-n junction.

9. The method of producing degenerately doped p-type gallium arsenide semiconductor material which comprises:
placing into a chamber a charge of crystalline gallium arsenide semiconductor material, an alloy of zinc and arsenic in contact with said material and an excess of arsenic;
sealing the chamber;
and heating the charge to doping temperature for a sufficient time for zinc to enter the gallium arsenide material in sufficient quantity to degenerately dope the same.

10. The method of degenerately doping gallium arsenide semiconductor material with p-type dopant which comprises:
placing into a chamber a charge of crystalline gallium arsenide semiconductor material, an alloy comprising said dopant, and an excess of arsenic;
and heating the charge to a temperature and time sufficient to diffuse said dopant into said semiconductor material.

11. The method of doping to a predetermined doping concentration crystalline gallium arsenide semiconductor material with p-type dopant, which comprises:
contacting said material with a ternary liquid of gallium, arsenic and a dopant material of the class consisting of zinc and cadmium whose dopant material concentration is in equilibrium with said predetermined concentration at the temperature of said liquid;
and cooling the liquid and material.

References Cited by the Examiner

UNITED STATES PATENTS

| | | | |
|---|---|---|---|
| 2,928,761 | 3/1960 | Gremmelmaier et al. | 148—189 |
| 2,956,216 | 10/1960 | Jenny et al. | 148—185 |
| 3,070,467 | 12/1962 | Fuller et al. | 148—188 |
| 3,092,591 | 6/1963 | Jones et al. | 252—62.3 |
| 3,110,849 | 11/1963 | Soltys | 148—33.1 |

DAVID L. RECK, *Primary Examiner.*

HYLAND BIZOT, BENJAMIN HENKIN, *Examiners.*